Aug. 31, 1965     L. SCHMID     3,203,522
CLUTCH WITH SYNCHRONIZING RING
Filed Jan. 25, 1961
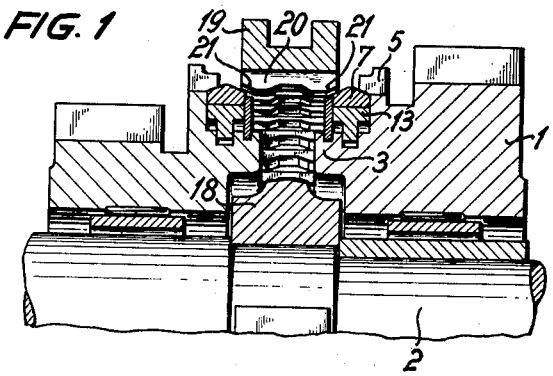
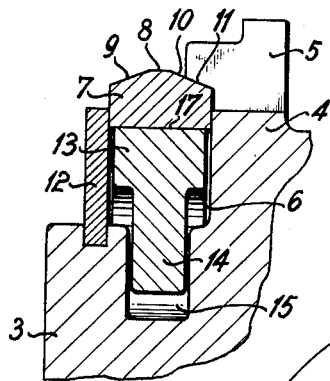
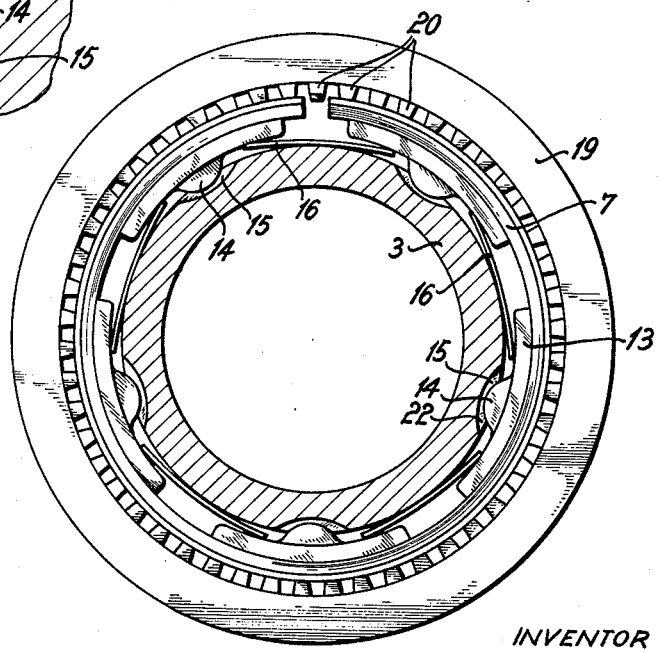
INVENTOR
Leopold SCHMID
ATTORNEYS

United States Patent Office 3,203,522
Patented Aug. 31, 1965

3,203,522
CLUTCH WITH SYNCHRONIZING RING
Leopold Schmid, Stuttgart, Germany, assignor to Firma Dr. Ing. h.c. F. Porsche KG, Stuttgart-Zuffenhausen, Germany
Filed Jan. 25, 1961, Ser. No. 84,902
Claims priority, application Germany, Feb. 11, 1960, P 24,419
16 Claims. (Cl. 192—53)

The present invention relates to a synchronization installation for change-speed transmissions provided with a springy, split or slotted synchronizing ring which is supported at a coupling or clutching member and cooperates with a shifting sleeve.

In the known synchronizing arrangements of the prior art, the synchronism is effected by frictional work between a synchronizing ring secured or retained in the direction of rotation at a clutching member and a shifting sleeve rotating together with a transmission shaft. Both of the parts of such prior art constructions are thereby provided with inclined surfaces which cooperate during the synchronization operation. In order to achieve a synchronization which is safe and reliable in operation, a corresponding width of the individual friction surfaces is necessary in order that a sufficient length of life of the installation is attained. The width of these friction surfaces is determinative for the length of the shifting path and the overall width of the synchronization installation. By appropirate selection of the material and a heat treatment or tempering of the parts, a certain reduction in the width of the synchronizing ring may well be obtained. Such steps and measures, such as, for example, the manufacture of the synchronizing ring of a special steel and the spraying thereon of a separate friction layer, however, enable only a relatively slight reduction in the structural dimensions of these prior art installations.

The aim and purpose underlying the present invention essentially consists in undertaking the basic consctruction of the parts of the synchronization installation in such a manner that a considerable reduction of the structural length of the installation is possible together with a relatively short shifting path, relatively small assembled width and slightest wear of the friction surfaces effecting synchronization.

The foregoing objects are attained in accordance with the present invention by the fact that the synchronizing ring is freely rotatable and is provided along the outer circumference thereof with working surfaces for the shifting sleeve and at the inner circumference thereof with friction surfaces for the friction members which are brought during the shifting operation into abutment against the clutching or coupling member. In contradistinction to the known prior art installations, the significant friction work is no longer effected by the inclined surfaces of the synchronizing ring and of the shifting sleeve, but instead by the friction surfaces provided at the inner circumference of the synchronizing ring which cooperate with the friction bodies. This enables an increase in the width of the friction surfaces with a simultaneous reduction of the overall width of the synchronizing ring. Since the specific load of the friction surface is relatively small in that case, the synchronizing ring may be made of a material advantageous also for manufacture, for example, of a special casting. By reason of the relatively large friction surface, the wear is also smaller and therewith the length of life of the synchronizing ring is increased. Since the working surface of the synchronizing ring is constructed only as blocking surface for the shifting sleeve, a reduction in the width of the shifting sleeve may also be realized. The latter as well as the relatively narrower synchronizing ring provides a considerably shorter shifting path. The reduction thereof may amount to more than 30 percent. Also, considerable savings in manufacturing costs are obtainable with the installation according to the present invention as a result of the reduction of the assembled width corresponding to the overall width, and the savings in material obtained thereby, as well as the elimination of the heat treating of the synchronizing ring and the relatively inexpensive basic materials that may now be used therefor.

The blocking surface of the synchronizing ring is constituted by an inclined surface the angle of attack of which is larger than 10°. The friction members are inserted into recesses of the coupling member with appropriate play and these recesses are so constructed that the friction members are pressed radially outwardly during the synchronizing operation. As a result thereof, there exists the possibility to determine the abutment force of the friction members at the synchronizing ring by appropriate configuration of the recesses or of the guide parts of the friction members, respectively. The friction members abut springly against the friction surface of the synchronizing ring. For that purpose, springs that are effective radially outwardly are inserted between the friction members and the coupling or clutching member. A frictional connection between the friction members and the ring is thereby established so that the latter during the beginning of the synchronization operation brings the friction members automatically into abutment at the coupling member or in the recesses, respectively.

Accordingly, it is an object of the present invention to provide a synchronization installation, especially for change-speed transmissions in motor vehicles, which eliminates the shortcomings and inadequacies of the prior art constructions.

It is another object of the present invention to provide a synchronization installation which is simple in construction, entails savings in both materials as well as installation and assembly costs, and which, additionally, is extremely reliable in operation.

A further object of the present invention resides in the provision of a synchronization system for change-speed transmissions which is not only simple in the overall construction, but also materially reduces the dimensions of the various parts without sacrifice of reliability of operation.

A further object of the present invention resides in the provision of a synchronization installation for change-speed transmissions of motor vehicles in which the length of life of the friction surfaces is considerably extended.

Another object of the present invention is the provision of a synchronization installation in which a considerable reduction in the structural width of the parts is possible in comparison with those of the prior art.

A further object of the present invention resides in the provision of a synchronization system for change-speed transmissions, especially of motor vehicles, in which a relatively short shifting path is realized.

Still another object of the present invention resides in the provision of a synchronization installation in which the friction surfaces are enlarged in width thereof while at the same time reducing the overall width of the synchronization ring.

These and other objects, features and advantages of the present invention will become more obvious from the following description when taken in connection with the accompanying drawing, which shows, for purposes of illustration only, one embodiment in accordance with the present invention, and wherein:

FIGURE 1 is a partial longitudinal cross-sectional view through a synchronization installation of a change-speed transmission in accordance with the present invention.

FIGURE 2 is a transverse cross-sectional view through the synchronization installation of FIGURE 1, on a reduced scale, and FIGURE 3 is a partial cross-sectional view, on an enlarged scale, showing certain details of FIGURE 1.

Referring now to the drawing, wherein like reference numerals are used throughout the various views to designate like parts, and more particularly to FIGURE 1, reference numeral 1 designates therein a gear wheel of a change-speed transmission, for example, of a motor vehicle. The gear wheel 1 is supported freely rotatably on the driven shaft 2 and is in meshing engagement with another gear wheel in a manner known per se and not illustrated in the drawing, which other gear wheel is arranged, for example, at a drive shaft. The gear wheel 1 is connected with the hub portion 3 which, for example, is integrally formed therewith and which carries an annularly shaped flange 4 (FIGURE 3) provided with teeth 5. A split, springy ring 7 is inserted in a freely rotatable manner within a recess 6 of the hub portion 3 or flange 4, whereby the outer circumference 8 of the ring 7 is provided with conically shaped inclined surfaces 9 and 10 (FIGURE 3). Consequently, in the embodiment according to the present invention, the synchronizing ring 7 is not retained within the hub portion 3 in a form-locking manner. The inclined surface 10 abuts in the installed or assembled condition of the ring 7 against a surface 11 of the recess 6 which represents the boundary or the retaining means for the ring 7 in the radial direction thereof. The axial securing of the ring 7 takes place by means of an annular disc 12 (FIGURE 3) anchored within the hub portion 3.

A plurality of friction members 13 are further arranged at the hub portion 3, which have the shape of annular segments or sections. Each friction member 13 is provided with a preferably semi-circularly shaped projection 14 which extends into a trough-shaped recess 15 of the hub portion 3 with play at least in the direction of rotation. The friction or coupling members 13 are under the influence of springs 16 by means of which the same are pressed against the inner circumference 17 of the split ring 7. The springs 16 are constructed in the illustrated embodiment as leaf springs which extend between two adjoining friction members 13 each. The leaf springs 16 thereby engage with the ends thereof underneath the respective friction members 13 and are supported intermediate the same at the hub portion 3.

A sleeve carrier member 18 which carries a shifting sleeve 19 is arranged at the shaft 2 in any suitable manner to rotate in unison therewith, for example, is keyed to shaft 2. The shifting sleeve 19 which is operatively connected in any suitable manner, for example, keyed by means of its teeth 20, with the carrier member 18 is adapted to be displaced in the axial direction and is provided with teeth 20, which correspond to the teeth 5 of the flanges 4 or hub portion 3, respectively, and are adapted to be brought into engagement therewith. The end surfaces of the teeth 20 are provided with inclined surface portions 21, which correspond to the inclined surfaces 9 as regards length and angle of attack thereof. The angle of attack of the inclined surfaces 9 and 21 amounts essentially to 20°.

*Operation*

The operation of the synchronizaton installation according to the present invention is as follows:

For purposes of shifting the transmission or engaging the gear wheel 1, the shifting sleeve 19 is displaced toward the right, as viewed in FIGURE 1 of the drawing. After a relatively short shifting path of the sleeve 19, the latter or, more accurately, the inclined surface 21 thereof comes into contact with the inclined surface 9 of the freely rotatable ring 7 so that the latter is rotated. If the direction of rotation of the shifting sleeve 19 or of the ring 7 is in the clockwise direction as viewed in FIGURE 2, then the friction members 13 pressed against the surface 17 of the ring 7 by means of springs 16, are also taken along. This entrainment takes place for such length of time until the projection 14 of each friction member 13 arrives at a wall 22 of the recess 15, whereby each wall 22 runs out in relatively flat manner. Since the friction members 13 are retained in the direction of rotation by wall 22, the ring 7 slides with the friction surface 17 thereof along the friction members 13, so that the friction work required for synchronization is produced thereby. More particularly, by the friction between the surface 17 and the friction members 13, more than 90 percent of the friction work is effectuated or produced which is necessary for purposes of achieving synchronization. The remainder of the friction work is obtained by the slippage between ring 7 and shifting sleeve 19. As long as synchronism does not exist between ring 7 and coupling or friction members 13, the coupling members 13 seek to slide radially outwardly along the walls 22 which run out in a flat manner, with the result that the ring 7 is spread apart and is pressed against the shifting sleeve 19. As a result therof, the shifting sleeve 19 is blocked against any further axial displacement thereof for such length of time until synchronism between ring 7 and the friction members 13 or between the gear wheel 1 and the shifting sleeve 19 is established. If synchronism is attained, the friction members 13 slide along the wall 22 back into the normal position thereof and release the ring 7, which is compressed by the shifting sleeve 19 so that the shifting sleeve 19 may now slide over the same. As soon as the teeth 20 of the shifting sleeve 19 engage with the teeth 5 of the hub portion 3, a form-locking connection for a transmission of troque is established.

While I have shown and described one embodiment in accordance with the present invention, it is understood that the same is not limited to the particular details shown and described herein. For example, the number of friction members may be varied at will. Additionally, one or several helical springs may be used for the support thereof. Furthermore, the force acting on the ring 7, which effects the blocking and friction effect, may be also changed by constructing the wall 22 so as to run out with a more or less steep incline.

Thus, it is obvious that the present invention is susceptible of many changes and modifications within the spirit and scope thereof, and I, therefore, do not wish to be limited to the details shown and described herein, but intend to cover all such changes and modifications as are encompassed by the scope of the appended claims.

I claim:

1. A synchronization arrangement for synchronizing two rotary parts adapted to rotate relative to each other, comprising shifting means slidably mounted on one of said parts for rotation in unison therewith and provided with engageable surface means, springy split synchronizing ring means rotatably supported on the other of said parts for unlimited rotation with respect thereto, said ring means being adapted to cooperate with said shifting means and to be rotated thereby, said synchronizing ring means being provided along the outer periphery thereof with engageable surface means for engagement with the engageable surface means of said shifting means and along the inner circumference thereof with friction surface means, and frictional means frictionally engageable with said friction surface means and connecting means between said frictional means and said other part providing limited rotational movement of the applying radial force to said frictional means.

2. A synchronization arrangement for synchronizing two rotary parts adapted to rotate relative to each other, comprising axially movable means slidable but non-rotatably connected with one of said parts for initiating the synchronization operation, and means operatively disposed between said axially movable means and the other part for effecting synchronization including synchronizing split ring means rotatably secured on the other part for unlimited rotation and adapted for engagement by said axially movable means and friction means in radial frictional engagement with said synchronizing ring means and connecting means between said friction means and said other part providing limited rotational movement of and for applying radial force to said friction means, said synchronizing ring means being pressed radially outward against said shifting sleeve by said friction means until synchronism between said synchronizing ring means and said friction means is attained.

3. A synchronization arrangement, especially for change-speed transmission, comprising a rotary part, a rotatable part, a shifting sleeve slidably but non-rotatably mounted on said rotatable part and having engageable working surface means thereon, and springy split synchronizing ring means, means establishing an unlimited rotary path for said synchronizing ring means including means rotatably supporting said synchronizing ring means on said rotary part, said synchronizing ring means being provided along the outer periphery thereof with engageable working surface means for engagement with said working surface means provided on said shifting sleeve and along the inner circumference thereof with friction surface means, and friction means engaging said friction surface means on said synchronizing ring means, said friction means comprising circumferentially elongated shoe means and cam means supporting said shoe means on said rotary part.

4. A synchronization arrangement, especially for change-speed transmissions, for synchronizing two rotary parts adapted to rotate relative to each other, comprising axially movable shifting means operatively connected with one of said parts for rotation in unison therewith while enabling axial movements relative thereto for initiating synchronization upon axial movement thereof, springy split synchronizing ring means having an engageable means along the outer periphery thereof, said shifting means comprising engaging surface portions adapted to engage with said engageable means of said synchronizing ring means upon axial movement of said shifting means to thereby cause rotation of synchronizing ring means, said synchronizing means being provided along the inner circumference thereof with friction surface means, means establishing an unlimited rotary path for said synchronizing ring means including means rotatably supporting said synchronizing ring means on the other of said two rotary parts, and frictional means engaging the friction surface means of said synchronizing ring means to produce during synchronization of said two rotary parts a substantial portion of the friction work required for said synchronization, said frictional means comprising circumferentially elongated shoe means, and cam means supporting said shoe means on said other of said parts.

5. A synchronization arrangement, especially for change-speed transmissions, comprising a first rotatable part, a shifting sleeve, and springy split synchronizing ring means supported on said first part for unlimited rotation with respect thereto, said synchronizing ring means being engageable by said shifting sleeve, said synchronizing ring means being provided along the outer periphery thereof with working surfaces for said shifting sleeve and along the inner circumference thereof with friction surfaces, and friction means engaging said friction surfaces, and connecting means between said friction means and said first part providing limited rotational movement of and applying radial force to said friction means.

6. A synchronization arrangement, especially for change-speed transmissions, comprising a rotatable part, a shifting sleeve, and springy synchronizing ring means supported on said rotatable part for unlimited rotation with respect thereto, said synchronizing ring means being engageable by said shifting sleeve to be rotated thereby with respect to said rotatable part while synchronization is being attained, said synchronizing ring means being provided along the outer periphery thereof with engageable working surface means effectively constituting blocking means for said shifting sleeve and along the inner circumference thereof with friction surface means, and friction body means engaging said friction surface means and connecting means between said friction body means and said rotatable part providing limited rotational movement of and applying radial force to said friction body means, said connecting means comprising recess means and projection means received therein.

7. A synchronization arrangement for synchronizing two rotary parts adapted to rotate relative to each other, comprising shifting means slidably connected with one of said parts for rotation in unison therewith and provided with working surface means, springy split synchronizing ring means rotatably supported on the other of said parts and adapted to be engaged by said shifting means, said synchronizing ring means being provided along the outer periphery thereof with working surface means for engagement with the working surface means of said shifting means and along the inner circumference thereof with friction surface means, and frictional means engageable with said friction surface means, the other part being provided with recess means for receiving therein with play said frictional means, and said recess means and frictional means being so constructed and arranged that said frictional means are pushed radially outwardly during synchronization.

8. A synchronization arrangement, especially for synchronizing two rotary parts adapted to rotate relative to each other, comprising shifting means slidably but non-rotatably connected with one of said parts, springy split synchronizing ring means supported on the other of said parts and adapted to be engaged by said shifting means, said synchronizing ring means being provided along the outer periphery thereof with inclined surface means effectively constituting blocking means for said shifting means and along the inner circumference thereof with friction surface means, means establishing an unlimited rotary path for said synchronizing ring means including means rotatably supporting said synchronizing ring means on said other of said parts, and frictional means engageable with said friction surface means, said shifting means being effective to rotate said synchronizing ring means around said frictional means as synchronization is initiated, said frictional means comprising circumferentially elongated shoe means and cam means supporting said shoe means on said other of said parts.

9. A synchronization arrangement according to claim 8, wherein the angle of attack of said inclined surface means is greater than 10°.

10. A synchronization arrangement for synchronizing two rotary parts adapted to rotate relative to each other, comprising shifting means slidably connected with one of said parts for rotation in unison therewith and provided with working surface means, springy split synchronizing ring means supported on the other of said parts and adapted to be engaged by said shifting means, said synchronizing ring means being provided along the outer periphery thereof with working surface means for engagement with the working surface means of said shifting means and along the inner circumference thereof with friction surface means, and frictional means cooperating with said friction surface means, spring means urging said frictional means essentially radially outwardly into engagement with the friction surface means of said synchronizing ring means, the other part being provided with recess means for receiving therein with play said frictional means, and said recess means and frictional means being so constructed and arranged that limited rotational movement and radial force are applied to said frictional means, said frictional means being pushed radially outwardly during synchronization.

11. A synchronization arrangement for change-speed transmission comprising a coupling member, a shifting sleeve, and springy synchronizing ring means, means establishing an unlimited rotary path for said synchronizing ring means including means rotatably supporting said synchronizing ring means on said coupling member, said ring means being engageable by said shifting sleeve and being provided along the outer periphery thereof with working surfaces for frictional engagement by said shifting sleeve and along the inner circumference thereof with friction surfaces, said synchronizing ring means being rotatable by said shifting sleeve upon said engagement, and friction body means comprising circumferentially elongated shoe means engaging said friction surfaces and cam means supporting said shoe means on said coupling member.

12. A synchronization arrangement for change-speed transmission comprising a coupling member, a shifting sleeve, and springy synchronizing ring means, means establishing an unlimited rotary path for said synchronizing ring means including means rotatably supporting said synchronizing ring means on said coupling member, said ring means cooperating with said shifting sleeve, said synchronizing ring means being provided along the outer periphery thereof with working surfaces engageable by said shifting sleeve and along the inner circumference thereof with friction surfaces, and friction body means including friction members and spring means engaging said friction members, said friction members engaging said friction surfaces of said synchronizing ring means, said friction members being in the form of circumferentially elongated shoes, and cam means supporting said friction members on said coupling member.

13. A synchronization arrangement, especially for change-speed transmissions, having two means adapted to be synchronized while rotating at different speeds comprising first means including a shifting sleeve adapted to be displaced through a shifting path, second means, synchronizing ring means engageable by said shifting sleeve, said synchronizing ring means having an essentially cylindrical inner friction surface, means establishing an unlimited rotary path for said synchronizing ring means including means rotatably supporting said ring means on said second means, friction body means having arcuate friction surface means engageable with the inner friction surface of said synchronizing ring means, and means for producing frictional work between said synchronizing ring means and said friction body means during synchronization of said two means including cam means supporting said shoe means on said second means.

14. A synchronization arrangement, especially for change-speed transmissions, comprising rotatable means, a shifting sleeve, and springy synchronizing ring means supported for unlimited rotation on said rotatable means to enable rotation of said synchronizing ring means around said rotatable means upon engagement of said synchronizing ring means with said shifting sleeve, said synchronizing ring means adapted to be spread in the radial direction and being provided along the inner circumference thereof with friction surface means, friction body means cooperating with said friction surface means, and connecting means between said friction body means and said rotatable means providing limited rotational movement of and applying radial force to said friction body means.

15. A synchronization arrangement, especially for change-speed transmissions, having two means adapted to be synchronized while rotating at different speeds comprising first means including a shifting sleeve slidably but non-rotatably connected thereto and adapted to be displaced through a shifting path, second means, synchronizing ring means supported on said second means for unlimited rotation with respect thereto and engageable by said shifting sleeve to be rotated thereby, friction body means supported on said second means and having arcuate surface portions cooperating with said synchronizing ring means, means for producing frictional work between said synchronizing ring means and said friction body means during synchronization comprising connecting means between said friction means and said second means providing limited rotational movement of and applying radial force to said friction body means.

16. A synchronization arrangement, especially for change-speed transmission, comprising rotatable means, a shifting sleeve adapted to establish a form-locking connection with said rotatable means, and springy synchronizing ring means adapted to cooperate with said shifting sleeve, means establishing an unlimited rotary path for said synchronizing ring means including means rotatably supporting said synchronizing ring means on said rotatable means, said synchronizing ring means adapted to be spread in the radial direction and being provided along the inner circumference thereof with friction surface means, friction body means engageable with said friction surface means, and means operatively connecting said friction body means with said rotatable means to automatically produce engagement between said friction surface means and said friction body means during synchronization while simultaneously preventing said form-locking connection until synchronism essentially exists, said friction body means comprising circumferentially elongated shoe means, and said means operatively connecting said friction body means with said rotatable means comprising cam means.

References Cited by the Examiner

UNITED STATES PATENTS

| Re. 20,373 | 5/37 | Murray. | |
| 1,760,223 | 5/30 | Wittkuhns | 192—77 X |
| 1,849,721 | 3/32 | Murray. | |
| 2,932,373 | 4/60 | Schmid. | |

FOREIGN PATENTS

| 1,250,284 | 11/60 | France. |
| 1,038,925 | 9/58 | Germany. |
| 596,950 | 1/48 | Great Britain. |

DAVID J. WILLIAMOWSKY, *Primary Examiner.*

THOMAS J. HICKEY, *Examiner.*